Oct. 27, 1959   F. FISCHER ET AL   2,909,978
FOCAL PLANE SHUTTER
Filed Jan. 3, 1956   4 Sheets-Sheet 4
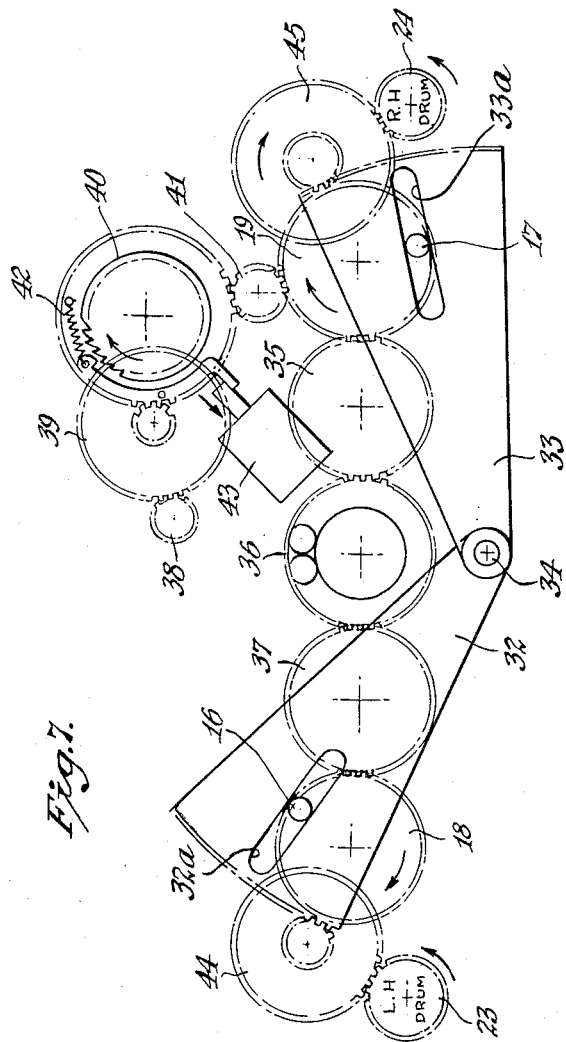
INVENTORS.
FRANZ FISCHER
BY VLADIMIR VIASMENSKY
Kenyon & Kenyon
ATTORNEYS.

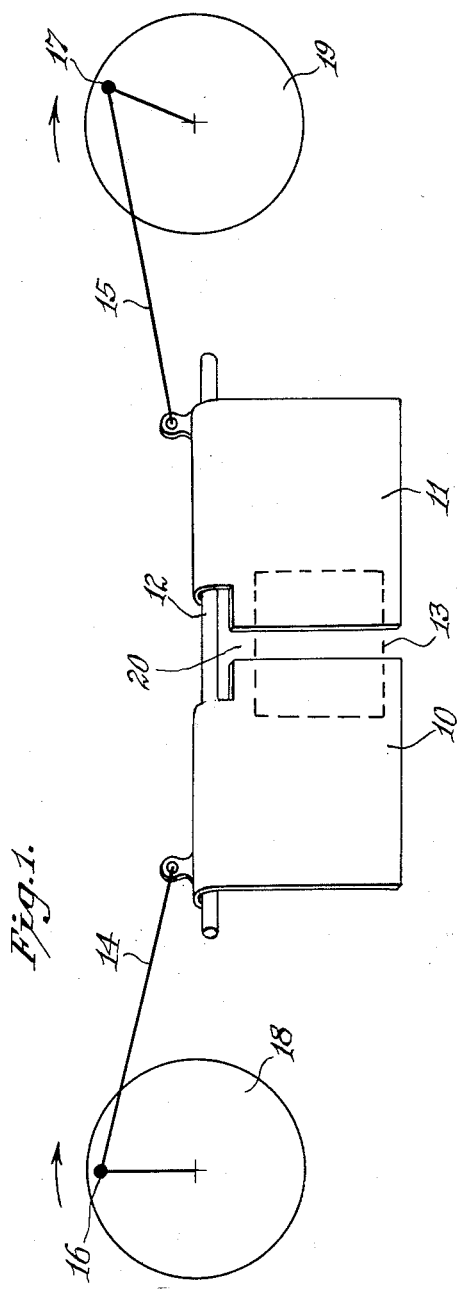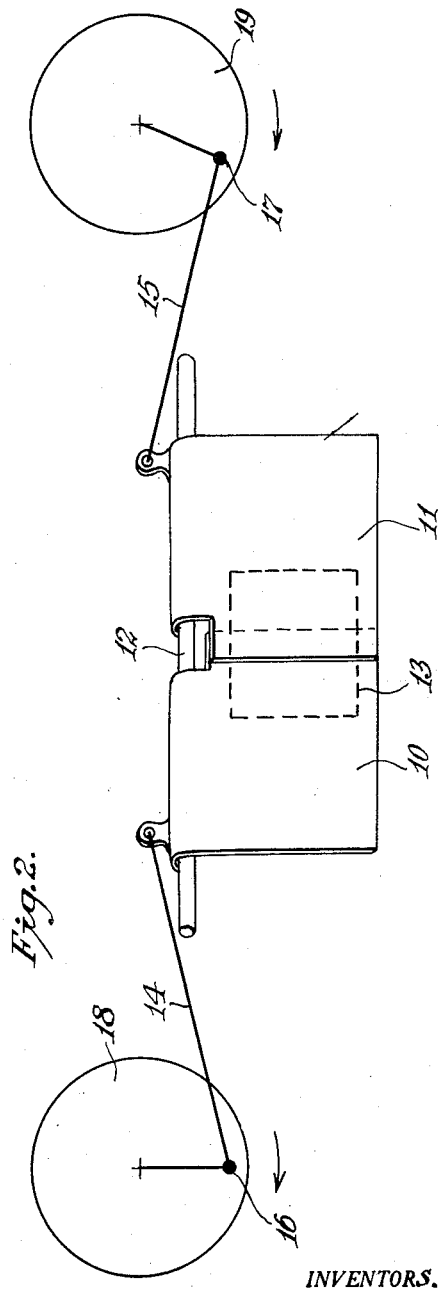

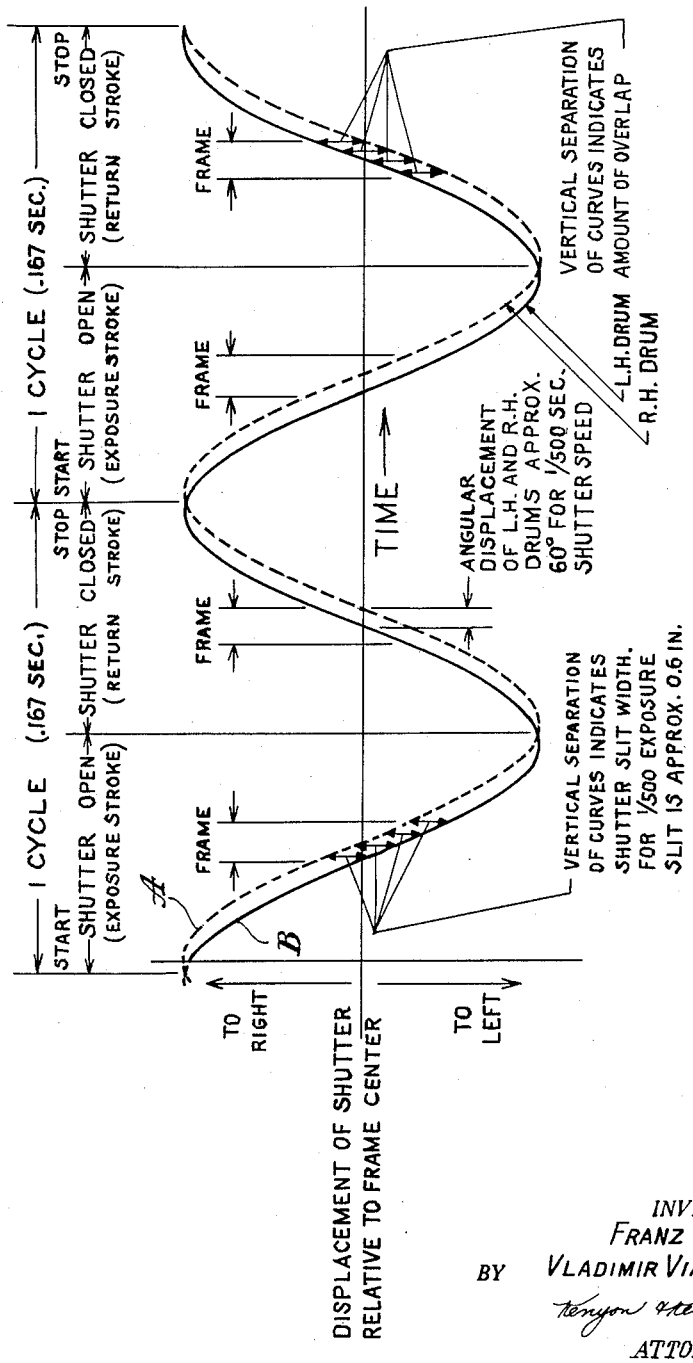

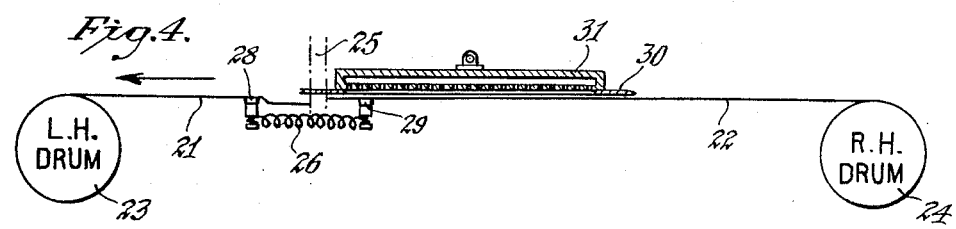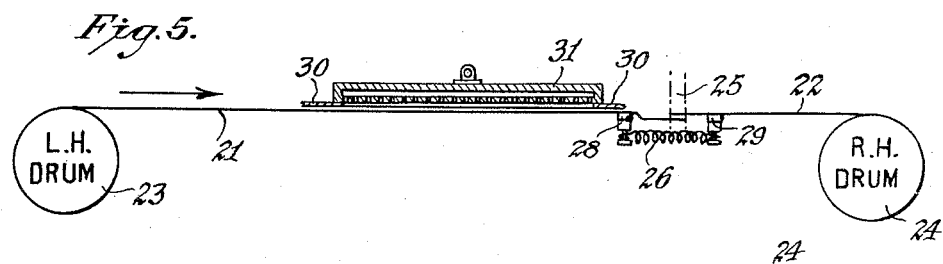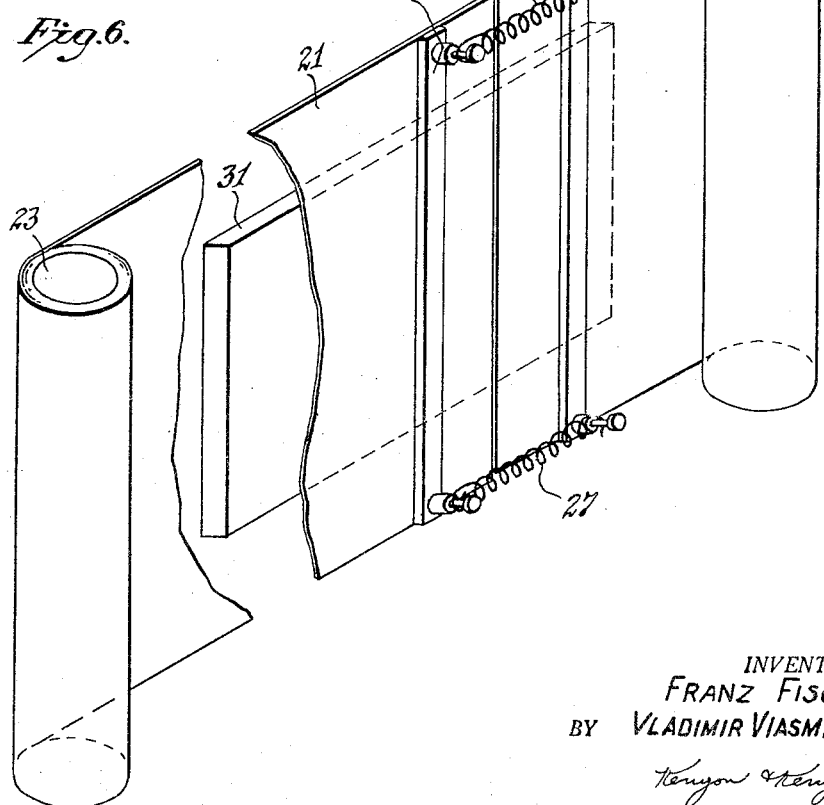

United States Patent Office 2,909,978
Patented Oct. 27, 1959

2,909,978

FOCAL PLANE SHUTTER

Franz Fischer and Vladimir Viasmensky, Jackson Heights, N.Y., assignors to Bulova Research and Development Laboratories, Inc., Woodside, N.Y., a corporation of New York Application January 3, 1956, Serial No. 557,004

4 Claims. (Cl. 95—57)

This invention relates generally to exposure shutters for photographic cameras, and more particularly to an improved focal plane shutter of simplified design adapted for repetitive action at a high frequency.

In one type of exposure shutter for photographic cameras a flexible blind or curtain travels in front of the film in close proximity to the principal focal plane of the camera lens. Formed in the curtain is a slit or rectangular opening extending at right angles to the direction of motion, the slit exposing successive areas of the film to the light image formed by the lens. While variations of velocity present no special difficulties, in practice the range of speeds is limited by extraneous considerations. Consequently, a satisfactory shutter must have means for varying the width of the slit easily, rapidly and accurately over a broad range of values. Furthermore, to avoid fogging the film, provision must be made to cover or cap the slit while the shutter is being reset.

Accordingly it is the main object of the invention to provide an improved focal plane shutter of simple, efficient and compact design. A shutter in accordance with the invention is continuously adjustable in a wide range of shutter speeds and functions accurately and reliably.

More particularly it is the object of the invention to provide a focal plane shutter capable of repetitive action at a high frequency, as for example, six frames per second or more, with a slit width adjustable in a range extending from a fraction of a millimeter to a centimeter or more without interrupting the working mechanism of the camera.

Another object of the invention is to provide a focal plane shutter mechanism having an exposure slit which is automatically closed during reset of the shutter without the need for separate blind or capping means.

Still another object of the invention is to provide a focal plane shutter mechanism in which the movement of the blinds is a close approximation of harmonic motion, whereby the shutter runs smoothly and with a minimum of acceleration. By reasons of the harmonic motion, there are points of zero velocity at which the repeating action may be interrupted or resumed after any predetermined interval.

For a better understanding of the invention as well as other objects and further features thereof, reference is had to the following detailed description to be read in conjunction with the accompanying drawing, wherein like components in the various views are identified by like reference numerals.

In the drawings:

Figure 1 is a diagram explanatory of the theory of the invention, showing the shutter during the exposure movement.

Figure 2 is a diagram showing the shutter during the reset movement.

Figure 3 is a curve showing the angular relation of the shutter in the course of operation.

Figure 4 is a plan view of the shutter during the exposure movement.

Figure 5 is a plan view of the shutter during the reset movement.

Figure 6 is a perspective view of the shutter.

Figure 7 is a schematic view of the shutter drive mechanism.

Referring now to the drawings and more particularly to Fig. 1, the principle of the invention will be illustrated by means of two opaque sheets 10 and 11 constituting a shutter arranged to slide in either direction on a bar 12 approximately in the focal plane of the camera lens adjacent a film gate 13 of a frame.

The sheets 10 and 11 are caused to reciprocate on bar 12 in accordance with harmonic motion by means of connecting rods 14 and 15, driven by crank pins 16 and 17, respectively. Crank pins 16 and 17 project from rotary discs 18 and 19, respectively.

By suitable gearing means, the discs 18 and 19 are both driven in the same clockwise direction and at uniform and equal speeds, thereby turning the crank pins in circular paths. Crank pin 16 is angularly displaced a given amount from crank pin 17, thereby forming an opening or slit 20 between the adjacent ends of the sheets. While the crank pins are in the upper part of their circle of travel, the slit or gap 20 between the plates will travel across the film frame 13 towards the right hand and maintain a substantially constant width due to the fact that crank pin 17 has a constant lead angle relative to crank pin 16. Fig. 1 therefore is illustrative of the shutter condition while the exposure is being made. The slit 20 travels across the frame 13 to expose successive areas of the film.

Fig. 2 shows the cam arrangement after the crank pins have each made half a revolution from their respective positions in Fig. 1. Crank pin 17 is in advance of crank pin 16 by the same angle as before, but the two plates 10 and 11 now overlap by an amount equal to the width of the gap 20. Consequently, as the plates shift or reset to the left across the frame gate 13, the shutter will be capped and the film not exposed. When the pins are halfway between the two positions shown in Figs. 1 and 2, the cranks will occupy substantially horizontal positions, the plates 10 and 11 will be at the end of their stroke and their edges will be in line with neither a gap or an overlap therebetween.

The arrangement shown in Figs. 1 and 2 is intended to illustrate the theory of the invention but for practical purposes it has the disadvantage of being mechanically cumbersome. In the preferred arrangement shown in Figs. 4 to 6, there is substituted for the shutter plates a pair of roller blinds 21 and 22, each blind consisting of a flexible material such as an opaque fabric band or a thin metal strip. The blinds 21 and 22 are rolled about drums 23 and 24, respectively.

The strips are positioned in parallel planes to permit overlap thereof. The two strips are separated during the exposure stroke by a slit 25. The two strips are connected across the slit by tension springs 26 and 27 connected between posts mounted on transverse bars 28 and 29 secured to strips 21 and 22, respectively, adjacent the ends thereof. The drums 23 and 24 are oscillated, by means to be later described to drive the strips.

The tension springs serve a dual purpose. They make the shutter curtain continuous, a condition which is of advantage in guiding the shutter travel. In addition the constant spring tension keeps the shutter taut at all times and takes up all backlash of the mechanism. This latter condition ensures very accurate control over tolerance errors in true slit width. The film 30, shown in Figs. 4 and 5, is held flat against an accurately machined focal plane plate 31 by a slight but continuous vacuum.

The mechanism for reciprocating the drums to carry out the shutter action is shown in Fig. 7. The mechanism comprises two toothed sectors 32 and 33 pivoted for oscillation about a common axis 34. The sectors are caused to oscillate by crank pins 16 and 17 projecting from discs 18 and 19 and extending into close fitting radial slots 32a and 33a formed in the body of each sector.

The discs 18 and 19 are geared together by a train of three wheels 35, 36 and 37 so as to run together in the same direction at equal speeds. In practice, wheel 36 is constituted by a differential gear arrangement which allows disc 18 to be advanced with respect to disc 19 through any desired angle by rotating the third member of the differential as required. This may be done by moving a pointer over a dial calibrated according to slit width or exposure time in seconds for the rate of travel fixed for the shutter.

Discs 18 and 19 are driven synchronously by a high speed clockwork or electrical motor 38 which is linked to disc 19 by a reduction gear train 39, 40 and 41. Also included is a single revolution clutch 42 actuated by a solenoid 43 to control the operation of the shutter mechanism.

The motor driven clutch 42 also drives the film feed sprockets (not shown) and the gearing is arranged to cause discs 18 and 19 to make one revolution for each film frame. The teeth on each sector 32 and 33 drive one of drums 23 and 24 through step-up gears 44 and 45, respectively. The two sectors are geared to operate with the same amplitude, and if they move strictly in phase with one another, the two strips 21 and 22 rolled on drums 23 and 24 (Fig. 6), will reciprocate together and the slit therebetween will remain of constant zero width during its to and fro motion.

If now, one of the crank pins, say 16 is advanced in phase with respect to crank pin 17, the left hand drum 23 will be in advance of the right hand drum 24 and during the motion from right to left (Fig. 4) the springs 26 and 27 will be stretched and the slit widened. When however the motion of the drums reverses (Fig. 5) the left hand drum 23 will still be in advance but it will have overtaken the right hand drum and will thus allow the springs to close the slit.

The periodic displacement of each strip of the shutter is substantially harmonic in time and may therefore be depicted as a sine curve, as shown in Fig. 3. Curve A in dashed lines represents the movement of the left hand drum, and curve B in unbroken line the movement of the right hand drum. When these curves are displaced in phase, it will be seen that one is above the other during motion from right to left and below the other while moving from left to right. Hence the width of the slit is a function of the phase angle. When the phase angle is zero, the slit is of zero width. For other angles we have a positive width of slit during its motion in one direction and a negative width or overlap in the other direction. The slit therefore is always self-capping during reset and its effective opening can be varied as required by changing the phases of crank pins 16 and 17 by means of the differential gears.

Close examination of the curves in Fig. 3 will reveal that the vertical separation between the curves which correspond to slit width is not perfectly constant for the whole span of the frame, but is slightly wider in the middle. This deviation however is virtually negligible and in any case largely compensated for by the fact that the rate of travel of the slit has its maximum at the midpoint of the frame. The change in slit width may be made in the course of shutter operation by acting upon the differential gears.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. An exposure shutter for photographic cameras comprising a pair of strip-shaped roller blinds of opaque flexible material, a pair of spaced drums on which said blinds are rolled, said blinds being extended from said drums in parallel planes to form a shutter curtain adjacent a frame in the focal plane of said camera, tension means uniting the free ends of said blinds and permitting variation in the width of a slit formed between said ends, means synchronously to oscillate said drums in opposing directions in accordance with harmonic motion to cause said slit to traverse said frame, and means to displace the phase of the oscillation of one drum relative to the other whereby said slit will be open during movement in one direction and closed during movement in the reverse direction.

2. An exposure shutter for photographic cameras comprising a pair of strip shaped roller blinds of opaque flexible material, a pair of spaced drums on which said blinds are rolled, said blinds being extended from said drums in parallel planes to form a shutter curtain adjacent a frame in the focal plane of said camera, tension means uniting the free ends of said blinds and permitting variation in the width of a slit formed between said ends, and means synchronously to oscillate said drums to cause said slit to traverse said frame, said oscillating means including a pair of rotary discs each having crank pins projecting therefrom, a pair of sector gears pivotally mounted on a common axis, said crank pins extending in slots in the respective gears whereby said gears are oscillated when said discs are rotated, gear means coupling said sector gears to said drums to effect concurrent oscillation thereof, and means to drive said discs simultaneously in the same direction.

3. A shutter as set forth in claim 2 further including a differential gear in said disc drive means to effect a phase displacement between positions of said crank pins.

4. An exposure shutter for photographic cameras comprising a pair of strip shaped roller blinds of opaque flexible material, a pair of spaced drums on which said blinds are rolled, said blinds being extended from said drums in parallel planes to form a shutter curtain adjacent a frame in the focal plane of said camera, tension means uniting the free ends of said blinds and permitting variation in the width of a slit formed between said ends, means synchronously to oscillate said drums in opposing directions in accordance with harmonic motion to cause said slit to traverse said frame, and means including a differential gear mechanism to displace the phase of the oscillation of one drum relative to the other whereby said slit will be open during movement in one direction and closed during movement in the reverse direction.

References Cited in the file of this patent

UNITED STATES PATENTS

| | | |
|---|---|---|
| 382,858 | Bausch | May 15, 1888 |
| 423,913 | Dossert | Mar. 25, 1890 |
| 436,404 | Dallmeyer et al. | Sept. 16, 1890 |
| 449,733 | Dallmeyer et al. | Apr. 7, 1891 |
| 647,530 | Schneider | Apr. 17, 1900 |
| 960,793 | Bingham | June 7, 1910 |
| 1,421,736 | Spiro | July 4, 1922 |
| 2,134,766 | Schieber et al. | Nov. 1, 1938 |
| 2,206,144 | Wittel | July 2, 1940 |
| 2,283,533 | Brueske | May 19, 1942 |
| 2,283,586 | Stechbart | May 19, 1942 |
| 2,315,279 | Simmon | Mar. 30, 1943 |
| 2,764,910 | Tole et al. | Oct. 2, 1956 |

FOREIGN PATENTS

| | | |
|---|---|---|
| 3,398 | Great Britain | 1889 |
| 131,762 | Germany | July 17, 1902 |
| 381,617 | France | Jan. 16, 1908 |
| 189,477 | Great Britain | Nov. 30, 1922 |